United States Patent [19]

Harris et al.

[11] Patent Number: 4,711,435
[45] Date of Patent: Dec. 8, 1987

[54] APPARATUS FOR HYDRAULIC DAMPING

[76] Inventors: John L. Harris, Kiln Cottage, Brighton Road, Lower Beeding, Horsham, West Sussex RH13 6NJ, England; John F. Benyon, 6 Denning Close, Fleet, Aldershot, Hampshire GU 13 9SP, England

[21] Appl. No.: 891,411
[22] PCT Filed: Jun. 8, 1984
[86] PCT No.: PCT/GB84/00199
§ 371 Date: Feb. 7, 1985
§ 102(e) Date: Feb. 7, 1985
[87] PCT Pub. No.: WO85/00209
PCT Pub. Date: Jan. 17, 1985

Related U.S. Application Data

[63] Continuation of Ser. No. 700,879, Feb. 7, 1985, abandoned.

[30] Foreign Application Priority Data

Jun. 20, 1983 [GB] United Kingdom ............... 8136722

[51] Int. Cl.$^4$ ............................ F16F 9/34; F16F 9/50
[52] U.S. Cl. .................................... 267/221; 137/493; 137/493.7; 188/280; 188/322.13
[58] Field of Search .................. 188/279–282, 188/284–286, 298, 311–320, 322.13–322.22; 267/8 R, 64.11–64.28, 116, 120, 124, 139; 137/859, 860, 852, 512.1, 516.11, 516.13, 493, 493.4, 493.9, 493.7, 845, 843, 512.15; 251/176, 903; 138/40, 46; 293/134–137

[56] References Cited

U.S. PATENT DOCUMENTS

| 2,521,202 | 9/1950 | Cloudsley | 188/282 |
| 3,164,164 | 1/1965 | Pall et al. | 137/493 X |
| 3,194,262 | 7/1965 | Hamilton et al. | 137/852 X |
| 3,430,648 | 3/1969 | Botkin | 137/493 |
| 3,762,514 | 10/1973 | Freitag | 188/314 X |
| 3,801,087 | 4/1974 | Akaike et al. | 267/139 |
| 3,809,118 | 5/1974 | Harding | 137/843 |
| 3,817,566 | 6/1974 | Keijzer et al. | 293/70 |
| 4,241,815 | 12/1980 | Federspiel | 188/282 |
| 4,311,302 | 1/1982 | Heyer et al. | 267/64.26 X |
| 4,335,644 | 6/1982 | Goes et al. | 188/282 X |
| 4,423,801 | 1/1984 | Miura | 188/322.14 |
| 4,506,809 | 3/1985 | Corsette | 137/493 X |

FOREIGN PATENT DOCUMENTS

| 0009112 | 11/1984 | European Pat. Off. . |
| 2005430 | 8/1971 | Fed. Rep. of Germany ... 137/493.9 |
| 2315638 | 1/1977 | France | 188/282 |
| 8500209 | 1/1985 | PCT Int'l Appl. | 188/282 |
| 1103464 | 2/1968 | United Kingdom . |
| 1539447 | 1/1979 | United Kingdom | 188/282 |
| 2070730 | 9/1981 | United Kingdom | 188/322.15 |

Primary Examiner—Douglas C. Butler
Attorney, Agent, or Firm—Walter C. Farley

[57] ABSTRACT

Apparatus for hydraulic damping has a housing (22) having a chamber (30), the chamber (30) dividing the housing (22) into two enclosures (18, 19), between which enclosures (18, 19) fluid may flow through the chamber (30), the chamber (30) having a first port (34) and a second port (36) each being in communication with a respective one of the enclosures (18, 19) and a member (31) arranged inside the chamber (30) such that increase of fluid pressure difference between the ports (34, 36) in either direction causes the member (31) to be deflected elastically so as to allow flow of fluid between the enclosures (18, 19) in the respective direction, the incremental deflection of the member (31) for a particular incremental increase of fluid pressure difference increasing at increasing fluid pressure difference.

4 Claims, 10 Drawing Figures

APPARATUS FOR HYDRAULIC DAMPING

This is a continuation of Ser. No. 700,879 filed Feb. 7, 1985 and now abandoned.

This invention relates to apparatus for hydraulic damping for use, for example, in a vehicle suspension system.

Known hydraulic dampers are used to provide energy absorption of transient energy inputs and to reduce or to damp out resonant oscillations in a suspension system.

In known hydraulic dampers, an input force of a transient or of an oscillatory nature causes the translational movement of a piston in a chamber and incompressible fluid in the piston chamber is caused thereby to flow through a flow restrictor such as a narrow channel or a small orifice. The restriction of fluid flow through the flow restrictor causes the movement of the piston to be dependent upon the rate of fluid flow through the restrictor. Since the cross-sectional area of the flow restrictor is relatively small compared to that of the piston and the piston is required to move in the chamber such that the rate of volume displacement of the piston is equal to the rate of flow of incompressible fluid through the restrictor, the motion of the piston is restricted.

If the flow restrictor is a channel, the force applied by the fluid to the piston surface to restrict the motion of the piston is approximately proportional to the velocity of the piston, whereas if the flow restrictor is an orifice, the force is approximately proportional to the square of the velocity of the piston. In most known arrangements the relationship between force and velocity is between these two extremes.

Known hydraulic dampers of this type have a disadvantage in that, while at relatively low input velocities of the piston, the above-described level of restriction gives adequate damping characteristics, at high input velocities of the piston, such as, for example, when the damper is mounted in a suspension system of a vehicle which is driven over rough terrain, the high damping forces applied to the piston in the damper will cause the suspension in the vehicle to give an unacceptably hard and uncomfortable ride.

Known arrangements used to alleviate this phenomenon involve incorporation of a pressure relief valve in parallel with the flow restrictor. The relief valve allows relief of fluid pressure in the damper when the pressure attains a particular value.

Known valve arrangements are also employed in hydraulic dampers to give asymmetric damping characteristics, that is to provide a different level of damping during the impact mode to that provided during the rebound mode. These valve arrangements are complicated and expensive to manufacture using conventional valve manufacturing techniques.

The present invention relates to apparatus for hydraulic damping which has good high input velocity and asymmetric characteristics, is simple in operation, design and manufacture, and is insensitive to contamination of fluid in the apparatus.

The present invention provides apparatus for hydraulic damping comprising a housing having a chamber therein, the chamber dividing the housing into two enclosures, between which enclosures fluid may flow through the chamber, the chamber having a first port and a second port, each being in communication with a respective one of said enclosures, and a member arranged inside the chamber such that increase of fluid pressure difference between the ports in either direction causes the member to be deflected elastically so as to allow flow of fluid between the enclosures in the respective direction, the incremental deflection of the member for a particular incremental increase of fluid pressure difference increasing at increasing fluid pressure difference.

Embodiments of the present invention will now be described by way of example with reference to the accompanying drawings, in which.

Figure 1:
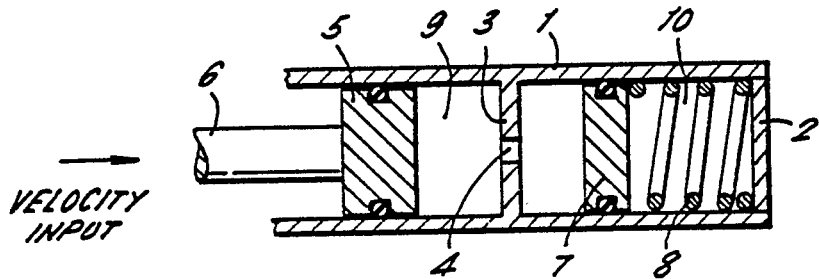
FIG. 1 shows an example of a known hydraulic damper system.

Referring now to FIG. 1 of the accompanying drawings, there is shown an example of a known hydraulic damper system. The system consists of a cylindrical housing (1) which is closed at one end (2) and has an annular plate (3) in the housing (1). The annular plate (3) has an external diameter equal to the internal diameter of the housing (1) and is spaced parallel to and distal from the end (2) of the housing (1). The diameter of the central orifice (4) of the annular plate (3) is substantially less than the external diameter of the annular plate (3), and is chosen according to the intended mode of use of the damper system. A piston (5) attached to a shaft (6) is arranged to be movable in the housing (1) as shown. The housing (1) further consists of a separator piston (7) and a spring (8), which spring (8) is disposed in a chamber (10) between the separator piston (7) and the end (2) of the housing (1). Alternatively, the spring (8) may be substituted by a compressible gas disposed in chamber (10) which is sealed. The chamber (9) in the housing (1) between the two pistons (5,7) is filled with an incompressible fluid, which is preferably an oil.

Movement of the piston (5) along the longitudinal axis of the housing (1) towards the end (2) of the housing (1) is restrained by the incompressible fluid in the chamber (9). The rate of movement of the piston (5) is determined by the rate of flow of the fluid through the orifice (4) and this latter rate is determined by the area of the orifice (4) and the spring constant of the spring (8).

The disadvantage of this type of system when employed to damp high input velocity forces are described hereinabove.

Figure 2:
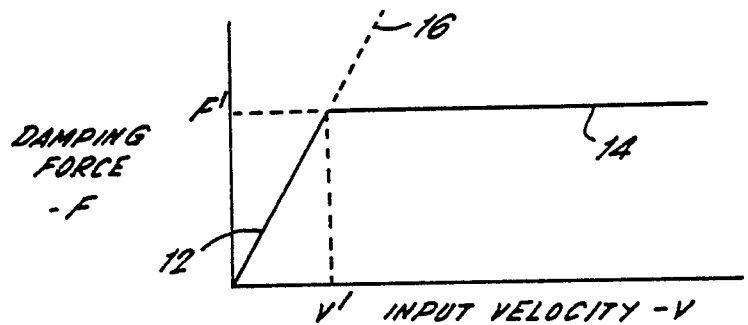
FIG. 2 shows diagrammatically a preferred relationship between the damping force (F) and the input velocity of the piston (V) for a hydraulic damping system.

FIG. 2 shows diagrammatically the preferred relationship between the damping force (F) and the input velocity (V) for a damping system when being employed to damp high velocity input forces. At low input velocity, there is a linear relationship (12) between the damping force F and the input velocity V. When the input velocity V attains a value V', the damping force F remains constant (14) at F' (or increases above F' at a very low rate) for any subsequent increase in input velocity V.

The relationship shown in FIG. 2 is preferred since for any increase in input velocity above V', the damping force remains substantially constant instead of increasing by continuing along a projection (16) of the linear relationship (12) and so the ride imparted by a suspension system, for example, will not appear harder or more uncomfortable due to large resisting forces created by input velocities greater than V'. In addition, large resisting forces create high stresses in the damping apparatus which can only be accommodated by increasing the weight of the apparatus. Ideally, the values of V' and F' can be predictable by careful design of the damping apparatus, and are chosen according to the intended use of the damping apparatus.

Figure 3:
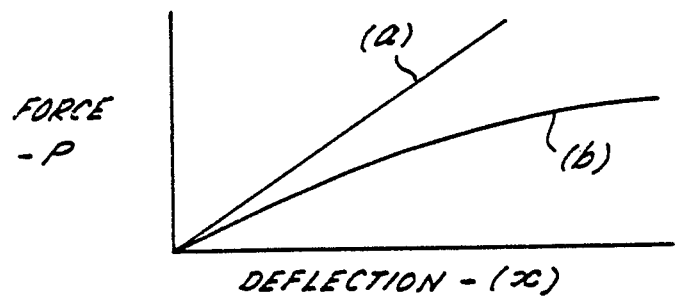
FIG. 3 shows diagrammatically the relationship between the force (P) and the deflection (x) of a linear spring, and a non-linear spring as used in a preferred embodiment of the present invention.

FIG. 3 shows the relationship between force (P) and deflection (x) for a linear spring (Plot (a)) and a non-linear spring (Plot (b)) as employed in a preferred embodiment of the present invention. The non-linear spring exhibits a pseudo-logarithmic relationship between force (P) and deflection (x), such that at increasing force P, any given incremental increase in force ($\Delta p$) will result in increasing deflection ($\Delta x$) of the spring.

Figure 4:
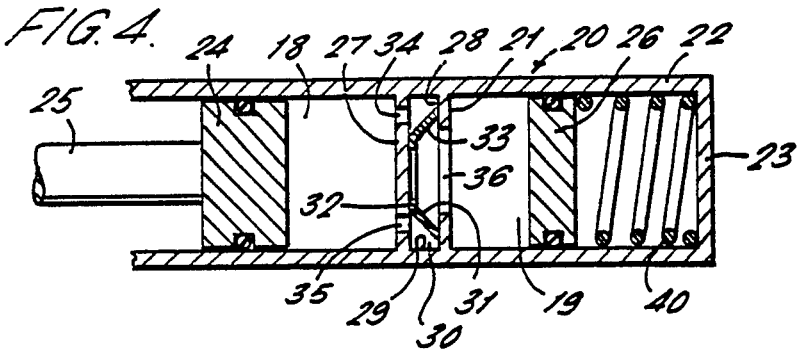
FIG. 4 shows a hydraulic damper system according to a preferred embodiment of the present invention.

FIG. 4 shows a hydraulic damper system (20) according to a preferred embodiment of the present invention, which system incorporates a hydraulic valve arrangement (21). The damper system (20) comprises a cylindrical housing (22) having one end (23) closed; a piston (24) movable along the longitudinal axis of the housing (22); a shaft (25) attached to the piston (24) as shown, and a second piston (26) attached to a spring (40), both of which are movable inside and along the longitudinal axis of the housing (22), and are arranged at the closed end (23) of the housing (22). Movement of the second piston (26) towards the closed end (23) causes compression of spring (40) between the second piston (26) and the closed end (23). The valve arrangement (21) is arranged in the housing (22) between the two pistons (24,26).

Fluid completely fills chamber (30) and the two enclosures (18) and (19) in the housing (22), which enclosures (18) and (19) are defined by the inner surface (29) of housing (22), an outer surface of chamber (30) and pistons (24) and (26) respectively, as shown.

The valve arrangement (21) according to a preferred embodiment of the present invention consists of a pair of circular plates (27,28) arranged in parallel and perpendicular to the longitudinal axis of the cylindrical housing (22). The plates (27,28) define, together with the cylindrical inner wall (29) of the housing (22), a cylindrical chamber (30) inside which chamber (30) is arranged a truncated hollow cone composed of a sheet material which acts as a conical disc spring (31). The longitudinal axis of the conical disc spring (31) is aligned with the longitudinal axis of the housing (22). Preferably, the low diameter end (32) of the conical disc spring (31) is nearer the piston (24) than is the high diameter end (33) of conical disc spring (31). When the conical disc spring (31) is undeflected prior to operation of the valve arrangement (21), each end (32,33) of the conical disc spring (31) is closely disposed against the surface of the respective plate (27,28) which surfaces define the chamber (30), and each end (32,33) is maintained in that position by a stress which is present at the interface between the ends (32,33) and the respective plates (27,28) and is due to the conical disc spring (31) having been elastically strained on insertion into chamber (30) in order to fit between plates (27,28).

The conical disc spring (31) may, for example, be a Belleville washer. It is composed, preferably, of a material having a high linear elastic modulus (Young's Modulus E) and a high toughness. The material used in the conical disc spring (31) is chosen in accordance with the intended use of the damper system.

Preferably, plate (27) has two parts (34,35) through the thickness of plate (27), which are preferably cylindrical in shape and are situated towards the edge of plate (27) such that no overlap of ports (34,35) with circular opening (39) defined by the low diameter end (32) of the conical disc spring (31) occurs. Alternatively, only one such port or more than two such ports may be provided in plate (27).

Plate 28 has port (36) through its thickness, which port (36) is preferably cylindrical in shape, is preferably aligned with the longitudinal axis of the housing (22) and has a diameter less than the diameter of the conical disc spring (31) at its high diameter end (33).

The valve arrangement (21) and its operation in use is shown in more detail in FIGS. 5a and 5b.

Figure 5:
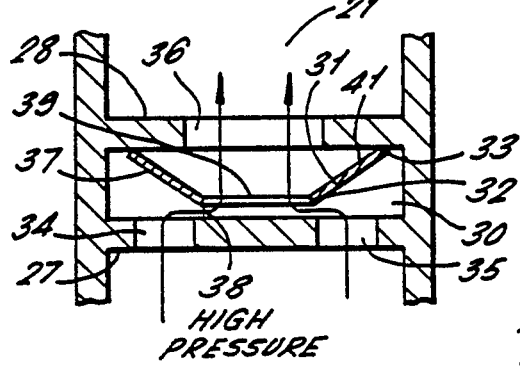
FIGS. 5 and 6 show two modes of operation of a hydraulic valve arrangement according to a preferred embodiment of the present invention.

In FIG. 5 is shown the operation of the hydraulic valve arrangement (21) during operation of the hydraulic damper system in the impact mode. Movement of piston (24) causes an increase in the pressure acting on the incompressible fluid between the piston (24) and the outer surface (27) of conical disc spring (31), such that in housing (22) the fluid pressure between valve arrangement (21) and piston (24) becomes greater than that between valve arrangement (21) and piston (26). At a particular value of the difference in fluid pressure acting on outer surface (37) and inner surface (41) of conical disc spring (31), which value is dependent upon the material properties of the conical disc spring, the conical disc spring (31) is elastically deflected, as shown, such that the acute angle between the longitudinal axis of conical disc spring (31) and the surface (37) of conical disc spring (31) is increased.

The deflection of conical disc spring (31) allows a gap (38) to be formed between the circular low diameter end (32) of conical disc spring (31) and the surface of plate (27). As is indicated by the arrows, fluid can flow through gap (38) through circular opening (39) at the low diameter end of conical disc spring (31), through conical disc spring (31) and thence through port (36) of plate (28), thereby reducing the volume and pressure of fluid between conical disc spring (31) and piston (24) and thus allowing piston (24) to move along the longitudinal axis of housing (22) towards value arrangement (21).

The spring characteristic of disc spring (31) of the Bellville washer type is non linear as shown in plot (b) of FIG. 3, i.e. the higher the differential pressure across the disc spring (31), the greater is its deflection per unit increase of the differential pressure. This has the effect of causing the damping force (P) to increase asymmetrically to a maximum value for increase in deflection (x).

Figure 6:
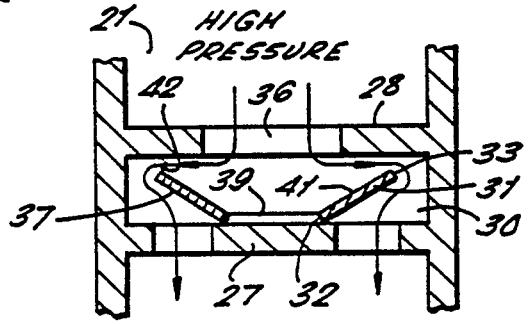

In FIG. 6 is shown the operation of the hydraulic value arrangement (21) during relaxation of the hydraulic system in the rebound mode. During the impact mode, build up of fluid pressure between valve arrangement (21) and piston (26) causes elastic compression of spring (40), thereby to reduce the said pressure. In the rebound mode, the fluid pressure between piston (26) and valve arrangement (21) is greater than that between piston (24) and valve arrangement (21).

At a particular value of the difference in fluid pressure acting on inner surface (41) and outer surface (37) of conical disc spring (31) the conical disc spring (31) is elastically deflected as shown, such that the acute angle between the longitudinal axis of the conical disc spring (31) and the surface (37) is increased. This deflection of the conical disc spring (31) allows a gap (42) to be formed between the circular high diameter end (33) of conical disc spring (31) and the surface of plate (28). As is indicated by the arrows fluid can flow through gap (42), through that part of chamber (30) which is defined by inner wall (29) of the housing (22) and outer surface (37) of conical disc spring (31), thence through ports (34) and (35), thereby reducing the volume and pressure of fluid between conical disc spring (31) and piston (26) and thus allowing piston (26) to move along the longitudinal axis of housing (22) towards valve arrangement (21).

In the valve arrangement shown in FIGS. 5 and 6 it may be seen that for a particular deflection of the conical disc spring (31), gap (38) formed in the impact mode has a smaller surface area than gap (42) formed in the rebound mode. This difference is due to the difference in diameter between the low diameter end (32) and the high diameter end (33) of conical disc spring (31). This particular arrangement results in a smaller area for fluid flow through the valve arrangement (21) during the impact mode than during the rebound mode, thereby giving a greater rate of energy absorption during the impact mode than during the rebound mode, and an asymmetric characteristic to the hydraulic damper system.

In some applications of the hydraulic damper system, a greater rate of energy absorption may be preferred during the rebound mode, and the valve arrangement (21) as hereinbefore described can be arranged in the hydraulic damper system (20) the opposite way round to that shown in FIG. 4.

The particular geometry of conical disc spring (31) may be selected in accordance with the desired operating characteristics of the valve arrangement (21).

Figure 7:
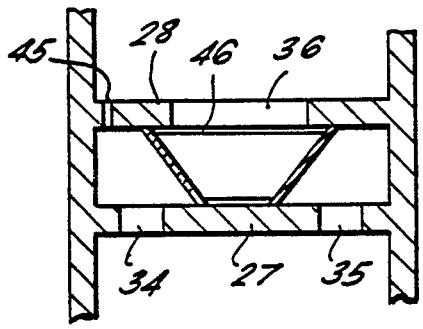
FIG. 7 shows a hydraulic valve arrangement according to a preferred embodiment of the present invention.

FIG. 7 shows a valve arrangement according to another preferred embodiment of the present invention. The arrangement is similar to that shown in FIGS. 5 and 6 but plate (28) has an orifice (45) through its thickness, as shown. Orifice (45) is positioned in plate (28) such that no overlap of orifice (45) with circular opening (46), defined by the high diameter end (33) of conical disc washer (31), occurs.

According to a similar preferred embodiment of the present invention, an orifice through plate (27) is positioned so as to be overlapped by the circular opening (39) at the low diameter end (32) of the conical disc spring (31).

Figure 8:
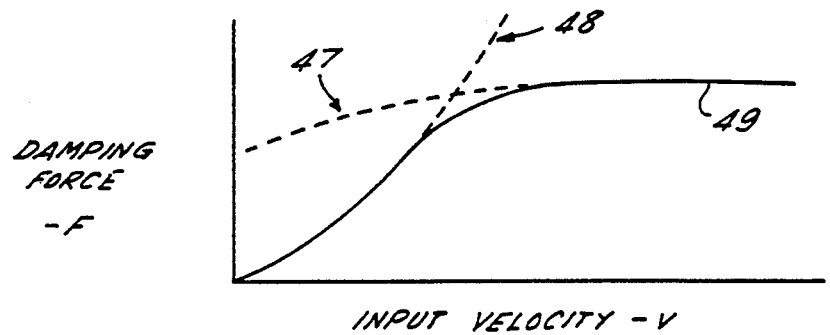
FIG. 8 shows the relationship between damping force (F) and input velocity (V) for a hydraulic valve arrangement as shown in FIG. 7.
Figure 9:
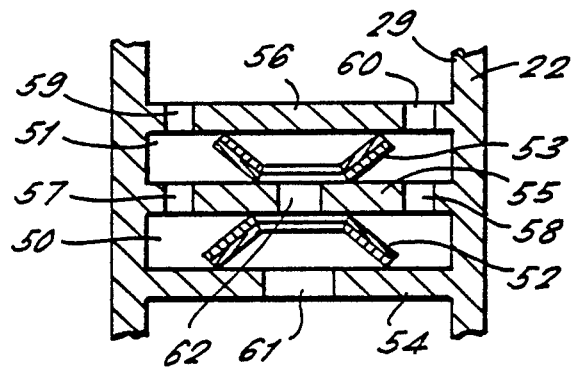
FIG. 9 shows a hydraulic valve arrangement according to a further preferred embodiment of the present invention.

The relationship between damping force F and input velocity V for the valve arrangement as shown in FIG. 7 is illustrated in FIG. 8. A typical relationship for the disc spring only is shown by dashed curve (47) and a typical relationship for the orifice only is shown by dashed curve (48). The combined effect of the orifice (45), which gives rise to a damping force less than that due to the conical disc spring (31) only at low input velocity, and the conical disc spring (31), which gives rise to a damping force less than that due to the orifice (45) only at high input velocity, results in an overall damping force/input velocity relationship as shown by solid curve (49). It may be seen that this relationship approximates to the desired relationship which is shown in FIG. 2.

To give a further improvement in performance and reliability of the valve arrangement according to a preferred embodiment of the present invention two or more conical disc springs (31) may be closely stacked together in chamber (30), in order to increase the spring constant of the arrangement relative to that of a single conical disc spring (31), but not substantially increase the particular value of the pressure difference between the inner and outer surfaces (41,37) of the conical disc spring (31) which is required for elastic deflection.

Further 9 shows such a valve arrangement according to a further preferred embodiment of the present invention. Two chambers (50,51) each containing a respective conical disc spring (52,53) are arranged in the housing (22), the chambers (50,51) being defined by the inner wall (29) of the housing (22) and plates (54) and (55) and plates (55) and (56) respectively. Plates (55) and (56) have ports (57,58) and (59,60) respectively, with ports (57) and (59), and (58) and (60), being aligned in parallel respectively, as shown. Plates (54) and (55) have ports (61) and (62) respectively, these ports (61) and (62) being aligned in parallel and along the longitudinal axis of both conical disc springs (52) and (53) and of housing (22).

This arrangement gives further improved flow characteristics of fluid through the valves.

Figure 10:
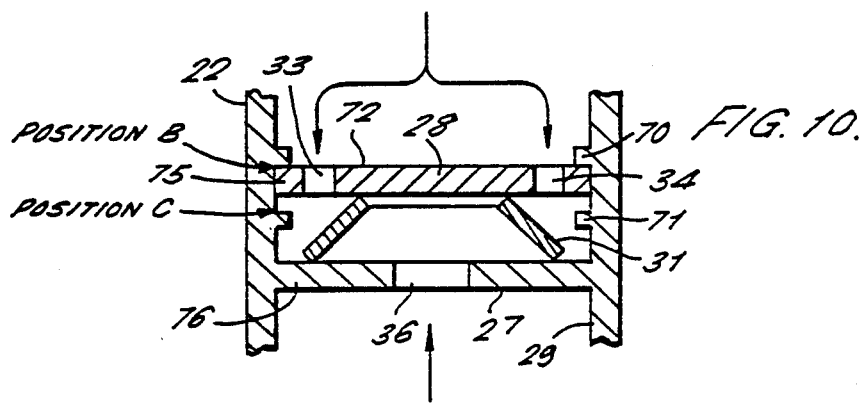
FIG. 10 shows a hydraulic valve arrangement according to a further preferred embodiment of the present invention.

FIG. 10 shows a valve arrangement according to a further preferred embodiment of the present invention, wherein one of the plates corresponding to plates (27) or (28) is allowed to float over a particular distance in order to give a particular minimum load to the conical disc spring (31) before fluid can flow through the valve arrangement. In the illustrated arrangement, plate (75) can float over a distance defined by the separation of inwardly facing projections (70, 71) disposed against the inner surface (29) of housing (22) as shown.

In the mode corresponding to the impact mode of FIG. 5, the floating plate (75) is initially at position B, at which position conical disc spring (31) is under minimum elastic deflection. Fluid pressure on the surface (72) of plate (75) and on outer surface (37) of conical disc spring (31) increases to a particular value such that the fluid pressure difference between respective fluid pressures on the outer and inner surfaces (37, 41) of conical disc spring (31) attains a value at which elastic deflection of conical disc spring (31) can occur. This deflection allows the fluid pressure acting on surface (72) of plate (75) to cause movement of plate (75) from position B to position C.

When plate (75) is at position C, any further increase in fluid pressure difference between the fluid pressures acting on outer surface (37) and inner surface (41) of conical disc spring (31) will cause the valve to operate in a manner corresponding to that shown in FIG. 5.

In the mode corresponding to the rebound mode of FIG. 6, the floating plate (75) is initially at position B, and the valve arrangement operates in a manner similar to that as shown in FIG. 6.

The valve arrangement shown in FIG. 10 leads to an increase in differential damping between the impact and rebound modes of operation when compared to the valve arrangement without a floating plate.

In another preferred embodiment of the present invention, plate (76) is arranged to float instead of plate (75), leading to a decrease in the differential damping between the impact and rebound modes of operation when compared to a valve arrangement but without a floating plate.

We claim:

1. An apparatus for hydraulic damping comprising the combination of
   a housing defining a first enclosure, a second enclosure and a chamber between said enclosures, said chamber having
      two surfaces facing each other, and means defining first and second ports for allowing fluid communication between said chamber and said first and second enclosures, respectively;
   first piston means movable in said first enclosure in response to externally applied force for changing the effective volume of said first enclosure;
   second piston means movable in said second enclosure,
      said housing and said first and second piston means defining an enclosed space between said piston means;
   hydraulic fluid filling said space;
   resilient energy storage means within said second enclosure for compression by said second piston means; and
   bidirectional valve means comprising a valve member within said chamber, said valve member comprising
      an elastic, truncated hollow cone having a small diameter end and a large diameter end,
      each of said ends being closely adjacent one of said surfaces in the absence of a fluid pressure difference between said ports,
      said valve member being responsive to a difference in fluid pressure between said ports in either direction to elastically deform and flatten to allow fluid flow through said ports between said enclosures in the direction of said difference and to be progressively increasingly flattened in response to increased flow rate in either direction of fluid flow so as to provide a decreasing spring rate in either direction, and wherein flow of fluid in the direction from said second port to said first port is substantially through said conical valve member and flow of fluid in the opposite direction is substantially across the outer surface of said valve member.

2. An apparatus according to claim 1 wherein said first port is located adjacent said large diameter end and along the longitudinal axis of said conical member and said second port is positioned adjacent said small diameter end and spaced from said axis a distance greater than the radius of said small diameter end.

3. An apparatus according to claim 2 wherein said housing further comprises at least one third port in communication with said chamber, each third port being positioned proximal to said large diameter end of said valve member and at a distance from said longitudinal axis substantially greater than the radius of said large end when said valve member is deformed.

4. An apparatus for hydraulic damping comprising the combination of
   a housing defining a first enclosure, a second enclosure and a chamber between said enclosures, said chamber having
      two generally parallel surfaces facing each other, said surfaces being spaced apart a predetermined distance, and
      means defining first and second ports through said surfaces for allowing fluid communication between said chamber and said first and second enclosures, respectively;
   a first piston movable in said first enclosure in response to externally applied force;
   a second piston movable in said second enclosure,
      said housing and said first and second pistons defining an enclosed space between said pistons;
   hydraulic fluid filling said space;
   resilient energy storage means within said second enclosure for compression by said second piston; and
   a bidirectional valve member within said chamber, said valve member comprising
      an elastically deformable, truncated hollow cone having a small diameter end and a large diameter end, said cone having an axial length substantially the same as said predetermined distance, said cone being positioned in said chamber so that each of said ends is closely adjacent one of said surfaces and so that each of said ends blocks one of said ports in the absence of a fluid pressure difference between said ports,
      said cone being elastically deformable to a plurality of shapes between a relaxed shape in which flow into or out of said chamber is substantially blocked and a flattened shape in which flow through said chamber is substantially unimpeded,
      said cone being responsive to a difference in fluid pressure between said ports in either direction to elastically deform and flatten to allow varying degrees of fluid flow through said ports between said enclosures in the direction of said difference and to be progressively increasingly flattened in response to increased flow rate in either direction of fluid flow so as to exhibit a decreasing spring rate, the flow of fluid in the direction from said second port to said first port being substantially through said conical valve member and flow of fluid in the opposite direction being substantially across the outer surface of said valve member.

* * * * *